United States Patent [19]
McClure

[11] 3,875,240
[45] Apr. 1, 1975

[54] SYNTHESIS OF ALDEHYDES

[75] Inventor: James D. McClure, Oakland, Calif.

[73] Assignee: Shell Oil Company, New York, N.Y.

[22] Filed: Feb. 16, 1973

[21] Appl. No.: 333,433

Related U.S. Application Data

[63] Continuation of Ser. No. 58,692, July 27, 1970, abandoned.

[52] U.S. Cl. .......................................... 260/604 HF
[51] Int. Cl. ............................................ C07c 45/02
[58] Field of Search ............................. 260/604 HF

[56]  References Cited
UNITED STATES PATENTS

| | | | |
|---|---|---|---|
| 2,694,735 | 11/1954 | Hull et al. | 260/604 HF |
| 2,834,815 | 5/1958 | Mertzweiller et al. | 260/604 HF |
| 3,008,996 | 11/1961 | Natta et al. | 260/604 HF |

FOREIGN PATENTS OR APPLICATIONS

| | | | |
|---|---|---|---|
| 614,010 | 12/1948 | United Kingdom | 260/604 HF |
| 1,527,562 | 4/1968 | France | 260/604 HF |

*Primary Examiner*—Leon Zitver
*Assistant Examiner*—Nicky Chan
*Attorney, Agent, or Firm*—Norris E. Faringer; Howard W. Haworth

[57]  ABSTRACT

Aldehydes are prepared by the reaction of mono-olefins with certain proportions of carbon monoxide and hydrogen at elevated temperatures and pressures in the presence of a water-promoted copper catalyst.

5 Claims, No Drawings

SYNTHESIS OF ALDEHYDES

This is a continuation of application Ser. No. 58,692, filed July 27, 1970, now abandoned.

BACKGROUND OF THE INVENTION

Aldehydes are commercially important chemicals. They are readily hydrogenated to alohols which are useful as solvents, plasticizers and the like. One conventional process for preparing aldehydes on a commercial scale is the OXO process wherein olefin, carbon monoxide and hydrogen are heated under pressure in the presence of a catalyst, generally dicobalt octacarbonyl. While dicobalt octacarbonyl has excellent catalytic activity in this reaction, the rising cost of cobalt is making it ever less attractive. Gresham et al. in U.S. Pat. No. 2,564,104, issued Aug. 14, 1951, disclose that a non-reducible aqueous solution of a water-soluble salt of copper can be used to catalyze the conversion of olefins to aldehydes. Gresham uses large amounts of water (100 grams of water with 10 grams of $Cu(OAC)_2$—$H_2O$) and employs relatively large amounts of carbon monoxide relative to the olefin present, that is, from 1 to 2 moles of carbon monoxide per mole of olefin present. In fact, the process of Gresham with its large excess of water and its low olefin to carbon monoxide ratios is of limited effectiveness. Falbe, in "Synthesen mit Kohlenmonoxyd" page 22, Springer-Verlag, Berlin, 1969, has shown that the examples of Gresham are not reproducible.

STATEMENT OF THE INVENTION

It has now been found that aldehydes are produced in high yields by reaction of mono-olefins with carbon monoxide and hydrogen when as catalyst there is employed metallic copper, i.e., copper in the zero oxidation state, promoted with from 0.2 to 4 moles of water per mole of copper and additionally when the molar ratio of olefin to carbon monoxide is kept high, suitably above 1.5 moles of olefin for each mole of carbon monoxide present.

DESCRIPTION OF PREFERRED EMBODIMENTS

Catalyst

Metallic copper, promoted with certain critical amounts of water, is employed as catalyst in this process. The copper may suitably be added to the reaction mixture as finely divided copper metal. It also may be added as a copper complex, salt or compound which is capable of being reduced completely to the metallic state in the atmosphere of carbon monoxide and hydrogen under the conditions of temperature and pressure employed in the reaction. Examples of materials which will reduce at least in part to metallic copper under the reaction conditions are cuprous and cupric oxides, cuprous and cupric hydrides, cuprous and curic salts such as the salts of mineral acids, for example, nitrates, chlorides, sulfates, such as the salts of mineral acids, for example, nitrates, chlorides, sulfates, sulfonates, alkyl and aryl sulfonates, and the like and salts of carboxylic acids, for example, acetates, propionates, octanoates, chloroacetates, dichloroacetates, trifluoroacetates and the like and cuprous and cupric complexes such as $Cu(NH_3)_2^+$, $CuH(C_5H_5N)_{0.2}$, $CuCl(CO)$, $CuCF_3CO_2(CO)$, $Cu(SO_3CH_3)(CO)$ and $Cu(SO_3C_6H_5)(CO)$, $(CO)$, and the like. Mixtures of these materials are also useful.

It is essential that the amount of water added to promote the copper's catalytic activity is controlled. Water is suitably added in amount of from 0.2 to 4 moles of water for each mole of copper added. The function of the water in promoting the catalytic activity of the metallic copper is not understood with certainty, however, larger or smaller amounts of water should be avoided as they greatly reduce the catalytic activity of the copper. Preferably, from 0.3 to 2 moles of water for each mole of copper is added, with water additions of from 0.4 to 1 mole per mole of copper being most preferred. It is thought that water may function as a source of cuprous hydride species which may, in fact, be among the active catalytic species present.

The process of the invention is characterized by the requirement for only catalytic quantities of copper metal catalyst. Although the utilization of larger amounts of catalyst is not detrimental to the process of the invention, amounts larger than about 20 mole percent (calculated as moles copper) based on the reactant carbon monoxide are not generally required. Amounts of copper less than about 0.1 mole percent on the same basis are generally impractical because of the inevitable physical losses of the catalyst during reaction and processing and the low rate of reaction. In most instances, amounts of copper catalyst from about 5 mole percent to about 15 mole percent based on reactant carbon monoxide are satisfactory and are preferred. Especially suitable are amounts of copper catalyst of from about 7 mole percent to about 10 mole percent on this basis.

The Olefin Feedstock

The process of this invention is generally applicable to the production of aldehydes from any aliphatic or cycloaliphatic compound having an ethylenic carbon-to-carbon bond. It is very suitably applied to the mono-olefinic hydrocarbons, especially those having from 2 to 19 carbon atoms, to give reaction mixtures of aliphatic aldehydes having one more carbon atom than the starting olefin. Ethylene, propylene, butylene, pentenes, hexenes, heptenes, octenes, dodecenes, their homologues etc., are a few examples of monoolefins very suitable as feedstocks. Lower alkenes, especially those with from 2 to 5 carbon atoms, that is, ethylene, propylene, butylenes, and pentenes are most preferred olefin feedstocks. Mixtures of olefins may, of course, be employed as feedstocks as well as hydrocarbon streams containing olefins mixed with saturated hydrocarbons.

Carbon Monoxide and Hydrogen

Carbon monoxide and hydrogen are reacted with the olefin in the presence of the catalyst. The molar ratio of carbon monoxide to hydrogen is not critical and may vary from 1 : 5 to about 5 : 1. Generally, mole ratios of carbon monoxide to hydrogen of from 1 : 1 to 1 : 3 are preferred. Commercially available synthesis gas is a very suitable source of carbon monoxide and hydrogen. The molar ratio of carbon monoxide to olefin is critical to the operability of this process. It is necessary to have a substantial molar excess of olefin present. If equimolar amounts of olefin and carbon monoxide are present, for example, the catalyst is almost totally inactive. The molar ratio of olefin to carbon monoxide is very suitably maintained at at least 1.5 to 1 and preferably from about 2 to 1 to about 20 to 1. Ratios of from about 3 to 1 to about 10 to 1 are preferred with ratios of about 7-8 to 1 being most preferred.

Reaction Conditions

Reaction temperatures preferably range between about 150°C and about 275°C. Temperatures of from about 170°C to about 225°C are most preferred.

The reaction may be carried out at a pressure of from about 1000 psig to about 4500 psig. Pressures in the range of from about 2000 psig to about 3500 psig are preferred.

The process of the invention is preferably carried out in liquid phase with a suitable inert reaction solvent. As reaction solvent, lower hydrocarbons and oxygenated lower hydrocarbons may be used. Suitable solvents comprise hydrocarbons of from about 4 to 15 carbon atoms, either saturated or having olefinic or aromatic unsaturation, and oxygenated hydrocarbons of from 4 to 15 carbons such as lower alkyl and aromatic ethers, lower alkyl esters, cyclic olefinic oxides, and the like. Examples of suitable solvents are: pentane, hexane, octane, decane, cyclo-hexane, hexane, toluene, and hydrocarbon fractions containing major proportions of said materials, ethyl phenyl ether, diphenyl ether, ethyl acetate, butyl butyrate, tetrahydrofuran, acetone, diethyl ketone, ethyl phenyl ketone, and 1,1-dichloroethane. Tetrahydrofuran and benzene are preferred solvents.

The process of the invention may be carried out as a batch operation or may be carried out continuously.

The Aldehyde Products

The aldehydes produced by this invention contain one carbon atom more than the starting olefin. For example, propionaldehyde is produced when ethylene is fed, n-butyraldehyde and iso-butyraldehyde are produced when propylene is fed. The aldehyde products are recovered from the reaction mixture by conventional means. Unreacted olefins and gases can be stripped from the mixture and then the aldehydes can be separated from the metal catalyst by filtration, decantation, flashing and the like.

The invention will be further described with reference to the following examples. These are for illustrative purposes only and are not to be construed as limitations on the invention.

EXAMPLE I

To a nitrogen-purged stainless steel 80- ml reactor were added 0.4 g (70 mmoles) of copper powder (Allied Chemical Company, less than 80 mesh), 0.063 g of water (3.5 mmoles), 30 g of tetrahydrofuran reaction solvent, 16 g of propylene, and 1.5 g of carbon monoxide. Hydrogen 0.25 g was then added. The molar ratio of water to copper was 0.5 : 1, the initial molar ratio of propylene to carbon monoxide was 7 : 1. The reaction mixture was heated and stirred at 195°–200°C for 8 hours. The initial pressure (at 200°C) was 2900 psig. This pressure dropped gradually as carbon monoxide and hydrogen were consumed. Analysis of the resulting product mixture by GLC showed that 64% of the carbon monoxide charged had reacted with propylene. Of the carbon monoxide which had reacted, 98% reacted to form aldehydes and 2% formed non-aldehyde by-products, i.e., alcohols. 60% Of the aldehyde formed was n-butyraldehyde and 40% was isobutyraldehyde.

COMPARATIVE EXPERIMENTS A, B, C, D

Four experiments were conducted to demonstrate the importance of controlling both the amount of water present (i.e., copper to water ratio) and the ratio of olefin to carbon monoxide. The feedstock conditions and general operating procedures of Example I were employed. The results of these experiments are summarized in Table I. When either the olefin to carbon monoxide molar ratio or the water to copper molar ratio was not in accordance with the invention, conversion of carbon monoxide to aldehydes was very low. Experiment A was carried out in accordance with the teachings of Gresham.

EXAMPLE II

Ethylene was converted to propionaldehyde by the process of the invention.

To a nitrogen-purged stainless steel 80 ml reactor were added 0.45 g (7.0 mmoles) of copper powder (Allied Chemical Company, less than 80 mesh), 0.063 g of water (3.5 mmoles), 30 g of tetrahydrofuran reaction solvent, 16 g of ethylene, and 2 g of carbon monoxide. Hydrogen (0.28 g) was then added. The molar ratio of water to copper was 0.5 : 1. The initial molar ratio of ethylene to carbon monoxide was 8 : 1. The reaction mixture was heated at a temperature of 180°C for 8 hours. The initial pressure (at 180°C) was 3200 psig. This pressure dropped gradually as carbon monoxide and hydrogen were consumed. Analysis of the resulting product mixture showed that 87% of the carbon monoxide charged had reacted with propylene. Of the carbon monoxide which had reacted, 68% reacted to form propionaldehyde and 24% to form diethylketone.

TABLE I

| Experiment Number | Propylene : CO Molar Ratio | Copper Added[11] Mmoles | Water : Copper Molar Ratio | Carbon Monoxide Conversion, % | Selectivity to Aldehydes, % |
|---|---|---|---|---|---|
| A[1] | 1 : 1 | 7 | — | 1.5 | 75 |
| B | 8 : 1 | 7 | 26 : 1 | 16.5 | 95 |
| C | 1 : 2 | 7 | 0.5 : 1 | 8 | 95 |
| D | 1 : 2 | 7 | 26 : 1 | 3 | 90 |
| Example I | 8 : 1 | 7 | 0.5 : 1 | 64 | 98 |

[1]Water used as solvent, no tetrahydrofuran present
[11]Added as copper acetate

I claim as my invention:

1. The process for the production of aldehydes which comprises contacting an alkene having from 2 to 19 carbon atoms with hydrogen and from 0.50 to 0.05 mole, per mole of alkene, of carbon monoxide in an inert liquid phase reaction hydrocarbon or oxygenated hydrocarbon solvent of from 4 to 15 carbon atoms at a temperature of from about 150 to 275°C and a pressure of from 2000 to 3500 psig in the presence of a catalyst comprising metallic copper promoted with 0.2 to 4 moles of water per mole of copper, thereby reacting the alkene with carbon monoxide and hydrogen with the formation of aldehydes having one more carbon atom than the alkene.

2. The process in accordance with claim 1 wherein the molar ratio of alkene to carbon monoxide is from 3:1 to 10:1.

3. The process in accordance with claim 2 wherein the molar ratio of water to copper is from 0.3:1 to 2:1.

4. The process in accordance with claim 3 wherein the alkene has from 2 to 5 carbon atoms to the molecule.

5. A process for the production of aldehydes which comprises contacting an alkene selected from the group consisting of ethylene and propylene with hydrogen and from 0.50 to 0.05 mole, per mole of alkene, of carbon monoxide in tetrahydrofuran at a temperature of from about 150° to 275°C and a pressure of from 2000 to 3500 psig in the presence of a catalyst comprising metallic copper promoted with 0.2 to 4 moles of water per mole of copper, thereby reacting the alkene, carbon monoxide and hydrogen to form aldehydes having one more carbon atom than the alkene.

* * * * *